United States Patent
Srikrishna et al.

[11] Patent Number: 6,147,834
[45] Date of Patent: Nov. 14, 2000

[54] DISK DRIVE WITH FORCED CONVECTION COOLING

[75] Inventors: Padmanabhan Srikrishna, Nashua, N.H.; Kumaraswamy Kasetty, Shrewsbury, Mass.

[73] Assignee: Quantum Corporation, Milpitas, Calif.

[21] Appl. No.: 09/212,459

[22] Filed: Dec. 16, 1998

[51] Int. Cl.[7] .................................................. G11B 17/02
[52] U.S. Cl. ............................................................ 360/97.02
[58] Field of Search .............................. 360/97.02, 97.03, 360/97.04; 369/275.5

[56] References Cited

U.S. PATENT DOCUMENTS

| | | |
|---|---|---|
| 5,305,164 | 4/1994 | Elsing . |
| 5,418,775 | 5/1995 | Okatani . |
| 5,557,595 | 9/1996 | Ishii ........................................ 360/97.02 |
| 5,870,247 | 2/1999 | Schirle ................................... 360/97.02 |

*Primary Examiner*—Robert S. Tupper
*Attorney, Agent, or Firm*—Steven G. Roeder

[57] ABSTRACT

A disk drive having forced convection cooling is provided herein. The disk drive includes a drive housing, a disk assembly, an actuator assembly, a fluid passageway and a fluid source. The drive housing defines a housing internal chamber which contains the disk assembly and the actuator assembly. The fluid passageway extends through the housing internal chamber near the disk assembly and the actuator assembly. The fluid source provides fluid flow through the fluid passageway to cool the housing internal chamber. This allows the disk drive to operate at cooler temperatures. As a result thereof, the disk drive is less affected by thermal expansion and the operational life of the components of the disk drive are increased.

18 Claims, 2 Drawing Sheets

DISK DRIVE WITH FORCED CONVECTION COOLING

FIELD OF THE INVENTION

The present invention relates generally to disk drives for storing data. More specifically, the present invention relates to a disk drive utilizing forced convection cooling to improve the performance of the disk drive.

BACKGROUND

Disk drives are widely used in computers and data processing systems for storing information in digital form. To obtain higher storage capacities, disk drives have evolved from utilizing a single rotating, storage disk, to utilizing a plurality of spaced apart, rotating, storage disks. The storage disks are commonly rotated by a spindle motor. Typically, the disk drive includes an actuator assembly having an actuator motor and a plurality of spaced apart actuator arms. The actuator motor moves the actuator arms to position a data transducer proximate a data storage surface of each storage disk.

The need for compact construction of the disk drive has led to the use of smaller disks and minimal separation between consecutive disks. With these systems, the accurate and stable positioning of each data transducer proximate each data storage surface is critical to the accurate transfer and retrieval of information from the rotating disks.

The need to rapidly access information has led to disk drives having storage disks which are rotated at higher speeds and actuator motors which move the data transducers relative to the storage disk at higher speeds. Generally, the spindle motor and actuator motor consume more power and generate more heat as speed increases. Additionally, the rotating storage disks generate more heat as the rotational speed increases. This results in higher operating temperatures within the drive housing.

Unfortunately, the reliability of the disk drive often decreases as the operational temperature increases. More specifically, thermal expansion caused by a higher operational temperature causes errors in data transfer between the data transducer and the disk drive due to inaccuracies in the positioning of the data transducer relative to the rotating disks. Further, higher operational temperatures also reduce the operational life of many of the electronic and mechanical components of the disk drive.

In light of the above, it is an object of the present invention to provide a stable and efficient disk drive which operates at cooler temperatures. Another object of the present invention is to provide a high speed disk drive having increased performance, increased accuracy and an increased operational life. Still another object of the present invention is to provide a disk drive which improves heat dissipation in the disk drive without introducing contaminants into the disk drive.

SUMMARY

The present invention is directed to a disk drive which satisfies these objectives. The disk drive includes a drive housing, a storage disk, a fluid passageway and a fluid source. The drive housing defines a housing internal chamber. The storage disk is positioned within the housing internal chamber. The fluid passageway extends through the housing internal chamber, near the storage disk. The fluid passageway is in fluid isolation from the storage disk to protect the storage disk from debris and contaminates. The fluid source provides a continuous supply of fluid flow to the fluid passageway to cool the housing internal chamber. This improves heat dissipation and lowers the operational temperature inside the drive housing. The lower operational temperature reduces the amount of thermal expansion, allows for accurate positioning of a data transducer near the storage disk and increases the operational life of the electronic and mechanical components of the disk drive.

The drive housing including a base, a pair of spaced apart housing end walls and pair of spaced apart housing side walls which define a housing internal chamber. A disk assembly and an actuator assembly are positioned within the housing internal chamber. In one version of the present invention, the fluid passageway extends along each of the side walls of the drive housing around the disk assembly and the actuator assembly. One of the housing end walls includes a pair of spaced apart passageway inlets which are in fluid communication with the fluid passageway. The other housing end wall includes the fluid source which is in fluid communication with the fluid passageway. In one embodiment of the present invention, the fluid source is a fan having a fan inlet which is in fluid communication with the fluid passageway. In this embodiment, the fan draws the fluid through the passageway inlets and the fluid passageway to convection cool the housing internal chamber.

As provided herein, the disk drive can include a shroud positioned within the internal drive chamber. The shroud cooperates with the drive housing to define the fluid passageway which extends through the housing internal chamber. In one of the embodiments provided herein, the shroud cooperates with one of the housing end walls to substantially encircle the disk assembly and the actuator assembly. This allows the shroud to isolate the disk assembly and the actuator assembly from the fluid which flows through the fluid passageway.

Preferably, the shroud includes one or more fins which cantilevering outwardly towards the housing side walls. The fins increase the surface area of the shroud to enhance thermal transfer between the shroud and the fluid which flows through the fluid passageway.

The invention also includes a method for cooling a housing internal chamber of a disk drive. The method includes the steps of providing a disk drive, providing a fluid passageway through the disk drive and forcing fluid through the fluid passageway to convection cool the housing internal chamber.

Importantly, the unique design provided herein increases the heat dissipation of the disk drive without contaminating the disk assembly and the actuator assembly. This reduces the operational temperature of the disk drive and increases the accuracy of the disk drive. Further, this increases the operational life of electronic and mechanical components of the disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
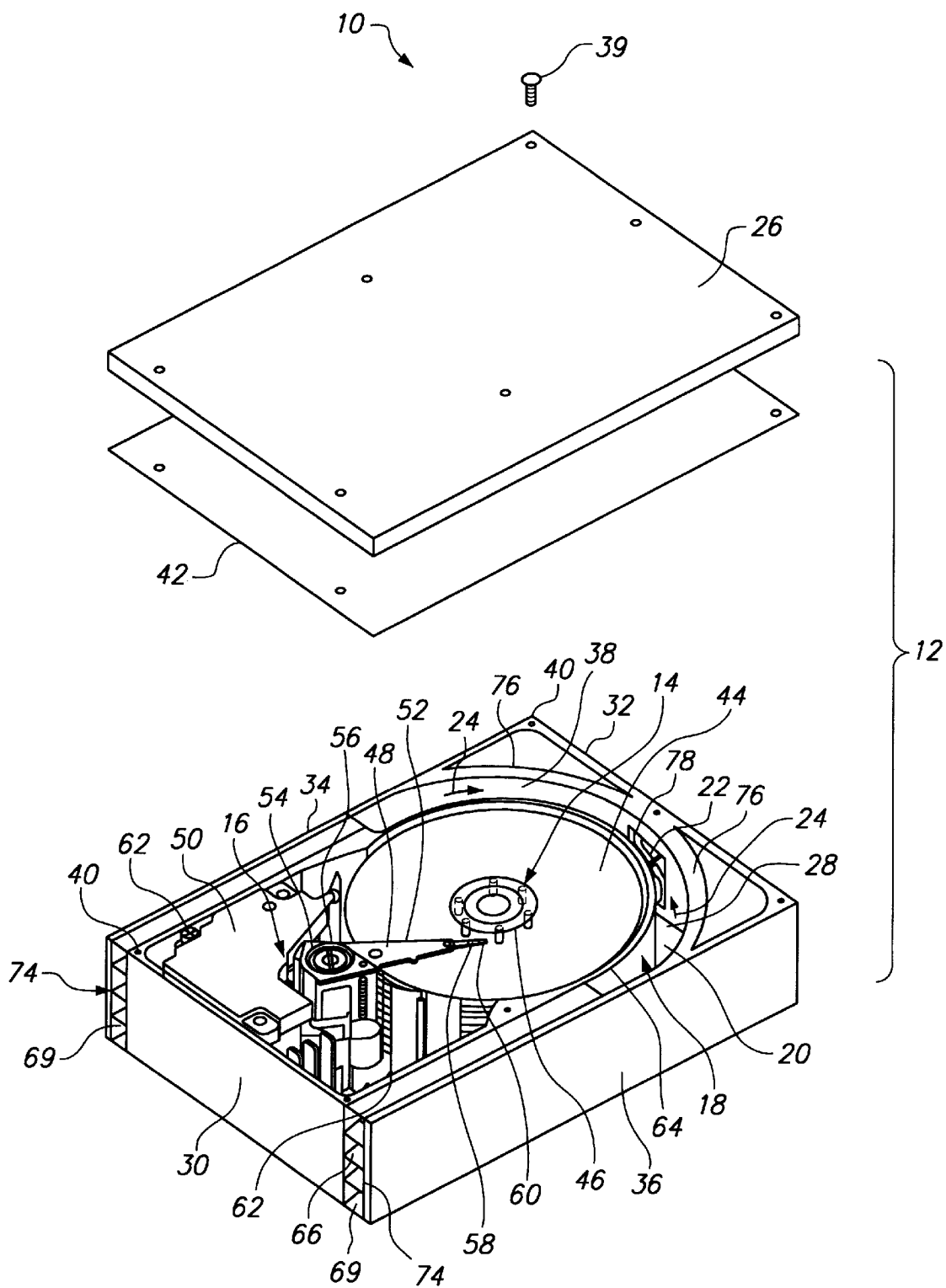
FIG. 1 is an exploded, perspective view of a disk drive having features of the present invention.
Figure 2:
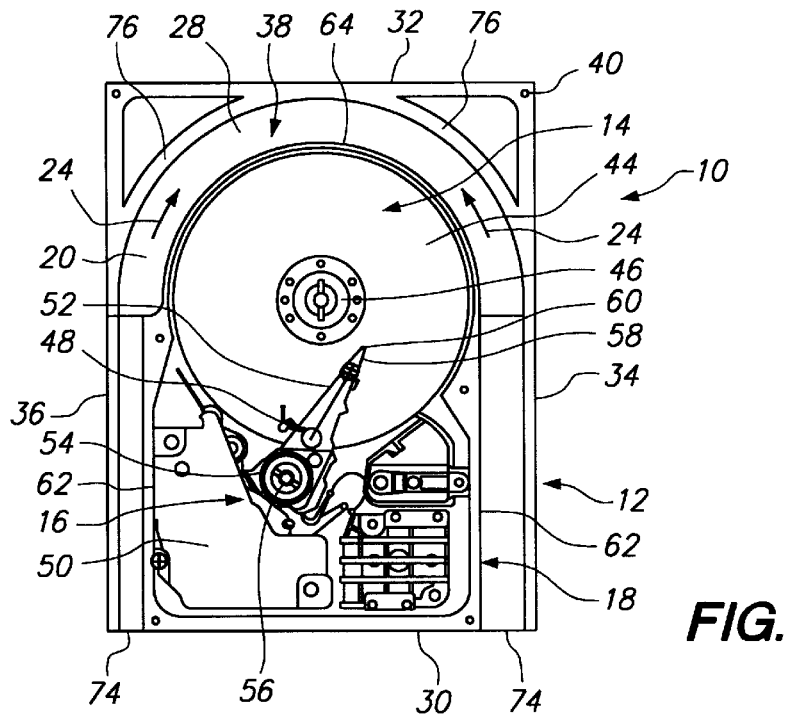
FIG. 2 is a top plan view of a portion of the disk drive of FIG. 1.

Referring initially to FIGS. 1 and 2, a disk drive 10 according to the present invention includes a drive housing 12, a disk assembly 14, an actuator assembly 16, a shroud 18, a fluid passageway 20 and a fluid source 22. As provided herein, the fluid source 22 provides a continuous flow of fluid 24 (represented as arrow) through the fluid passageway 20 to convection cool the shroud 18, the disk assembly 14 and the actuator assembly 16. Convection cooling reduces heat build-up in the disk drive 10 and reduces the operational temperature within the drive housing 12. The reduced operational temperature increases the accuracy of the disk drive 10 and increases the operational life of many of the electronic and mechanical components in the disk drive 10.

A detailed description of the various components of a disk drive 10 is provided in U.S. Pat. No. 5,208,712, issued to Hatch et al., and assigned to Quantum Corporation, the assignee of the present invention. The contents of U.S. Pat. No. 5,208,712 are incorporated herein by reference. Accordingly, only the structural aspects of a disk drive 10 which are particularly significant to the present invention are provided herein.

The drive housing 12 retains the various components of the disk drive 10. Referring to FIG. 1, the drive housing 12 is formed with a cover 26, a base 28, a first housing end wall 30, a second housing end wall 32, a first housing side wall 34 and a second housing side wall 36 which define a housing internal chamber 38. The housing walls 30, 32, 34, 36 are attached to the base 28 and can be formed as an integral unit. The cover 26 is attached to the housing walls 30, 32, 34, 36 with bolts 39 (only one bolt is illustrated) to enclose the housing internal chamber 38. Each bolt 39 extends through the cover 26 and engages a housing threaded aperture 40 in the walls 30, 32, 34, 36 to retain the cover 26 to the walls 30, 32, 34, 36. A gasket 42 can be positioned between the cover 26 and an upper edge of the walls 30, 32, 34, 36 to provide a hermetic seal between the housing walls 30, 32, 34, 36 and the cover 26 and to provide a fully enclosed and sealed housing internal chamber 38 for the disk assembly 14 and the actuator assembly 16.

The disk assembly 14 includes one or more spaced apart storage disks 44 mounted to a spindle hub 46. A spindle motor (not shown) rotates the spindle hub 46 and the storage disks 44 at a constant angular velocity. The rotation rate of the storage disks 44 varies according to the design of the disk drive 10. Presently, disk drives 10 utilize disks 44 rotated at an angular velocity of about 7,200 RPM. However, the present invention is suited for use with disk drives 10 having disks 44 which rotate at higher speeds. For example, the present invention can be used on disk drives having disks which rotate at about 9,000 RPM, 10,000 RPM, or 14,000 RPM.

Each storage disk 44 stores data in a form that can be subsequently retrieved if necessary. Magnetic storage disks are commonly used to store data in digital form. For conservation of space, each storage disk 44 preferably includes a data storage surface on each side of the storage disk 44. The storage disks 44 are manufactured by ways known to those skilled in the art. The embodiment illustrated in FIG. 1 includes twelve, spaced apart storage disks 44. Depending upon the design of the disk drive 10, any number of storage disks 44 can be used with the disk drive 10. For example, the disk drive 10 can alternately include one, six, or nine storage disks.

The design of the actuator assembly 16 depends upon the design of the disk drive 10. In the embodiment illustrated in FIG. 1, the actuator assembly 16 includes an E block 48 and an actuator motor 50. The E block 48 includes one or more actuator arms 52 which cantilever away from an actuator hub 54. The actuator hub 54 rotates on an actuator shaft 56 which is secured to the base 28.

A load beam 58 is commonly used to attach a data transducer 60 to one of the actuator arms 52. The actuator arms 52 rotate with the actuator hub 54 to position data transducers 58, proximate the storage disks 44. The number and spacing of the actuator arms varies according to the number and spacing of the disks 44. For example, the disk drive 10 shown in FIG. 1 includes twelve disks 44 and thirteen actuator arms 52. For this disk drive 10, the distance between the centerline of consecutive actuator arms 52 is between about 1.5 mm to 2.5 mm.

Typically, a single data transducer 60 interacts with a single storage surface on one storage disk 44 to access or transfer information to the storage disk 44. For a magnetic storage disk, the data transducer 60 is commonly referred to as a read/write head. It is anticipated that the present device can be utilized for data transducers other than read/write heads for a magnetic storage disk.

The actuator motor 50 precisely moves the actuator hub 54, actuator arms 52 and the data transducers 60 relative to the storage disks 44 to obtain access to the desired information on the storage disk 44. The actuator motor 50 can be implemented in a number of alternate ways. In the embodiment shown in the figures, the actuator motor 50 is a rotary voice coil actuator. Alternately, for example, the actuator motor could be a linear induction motor which moves radially with respect to the disks 44.

The shroud 18 cooperates with the first housing end wall 30, the base 28 and the cover 26 to encircle the disk assembly 14 and the actuator assembly 16. The shroud 18 isolates the disk assembly 14 and the actuator assembly 16 from the fluid 24 in the fluid passageway 20 so that dirt, dust and contaminates do not enter the disk assembly 14 and actuator assembly 16 from the fluid passageway 20. These contaminates can cause errors in data transfers and/or the data transducers 60 to crash into the storage disks 44.

In the embodiment illustrated in the figures, the shroud 18 is substantially "U" shaped and includes a pair of spaced apart shroud side walls 62 and an arched shaped shroud wall 64 which extend between the base 28 and the cover 26. Each shroud side wall 62 extends substantially parallel with the housing side walls 34, 36. The arched shaped shroud wall 64 partially encircles the disk assembly 14.

The shroud 18 is positioned near the disk assembly 14 and the actuator assembly 16 so that heat from disk assembly 14 and the actuator assembly 16 readily transfers to the shroud 18. As a result thereof, fluid 24 flow over the shroud 18 can effectively carry heat away form the disk assembly 14 and the actuator assembly 16 without subjecting the disk assembly 14 and the actuator assembly 16 to harmful contaminates which can cause the data transducers 60 to crash into the storage disks 44.

Figure 3:
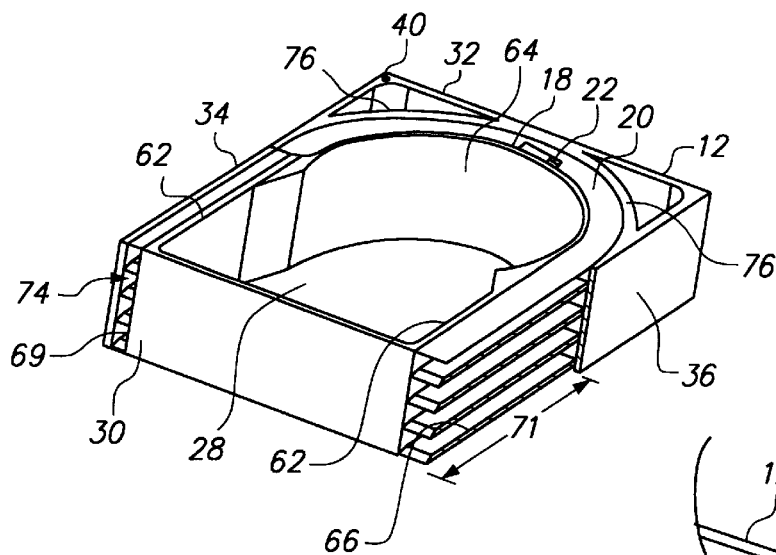
FIG. 3 is a perspective view of a portion of a drive housing, in partial cutaway and a shroud having features of the present invention.
Figure 4:
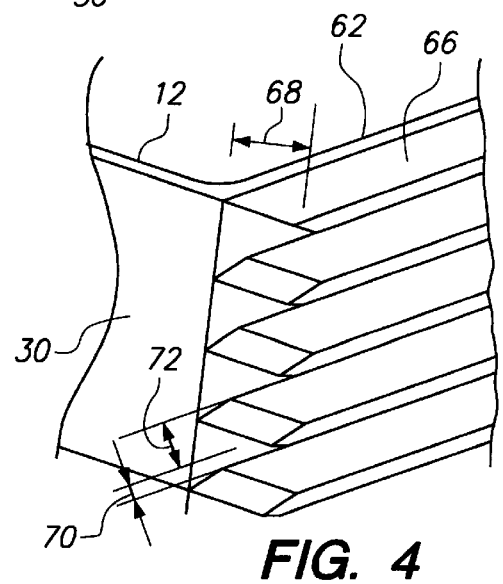
FIG. 4 is an enlarged perspective view of a portion of a shroud having features of the present invention.

The shroud 18 preferably includes one or more fins 66 which extend into the fluid passageway 20. The fins 66 increase the surface area of the shroud 18 to enhance thermal transfer between the shroud 18 and the fluid 24. The size, length, shape, thickness, number and spacing of fins 66 can be varied to suit the cooling needs and size restraints of the disk drive 10, as well as the characteristics the fluid source 22. In the embodiment illustrated in FIGS. 3 and 4, the shroud 18 includes five spaced apart fins 66 which extend horizontally along the shroud side walls 62 but not along the arched shaped shroud wall 64. These fins 66 form four fin passageways 69 which extend along the shroud side walls 62. In this embodiment, each fin 66 has a fin depth 68 of approximately 0.225 inches, a fin thickness 70 of approximately 0.050 inches and a fin length 71 of approximately 3.3 inches. Further, the fin spacing 72 between adjacent fins 66 is approximately 0.25 inches.

The fluid passageway 20 extends through the housing internal chamber 38 near the disk assembly 14 and the actuator assembly 16 and is in fluid isolation from the disk assembly 14 and the actuator assembly 16. In the embodiment illustrated in the figures, the fluid passageway 20 extends around the shroud 18 along each housing side wall 34, 26 and the second housing end wall 32. The fluid passageway 20 is defined by the area between the shroud 18, each housing side wall 34, 26 and the second housing end wall 32. Additionally, the fluid passageway 20 includes a pair of spaced apart passageway inlets 74 which extend through the first housing end wall 30. Each passageway inlet 74 extends into the gap between the shroud 18 and one of the housing side walls 34, 36.

Preferably, the disk drive 10 includes a pair of spaced apart arc shaped segments 76 which are spaced apart from the arch shaped shroud wall 64. Each segment 76 extends between one of the housing side walls 34, 36 and the second housing end wall 32. The arc shaped segments 76 maintain the flow of the fluid 24 against the arched shaped shroud wall 64 to promote thermal transfer between the shroud 18 and the fluid 24.

The fluid source 22 provides continuous fluid 24 flow to the fluid passageway 20 to cool the disk assembly 14 and the actuator assembly 16. The design of the fluid source 22 can be varied to suit the needs of the disk drive 10 and the fluid passageway 20. In the embodiments illustrated in the figures, the fluid source 22 is a miniature fan which is secured to the second housing end wall 32. The fan includes a fan inlet 78 which is in fluid communication with the fluid passageway 20 and a fan outlet (not shown) which is directed outside of the drive housing 12. Thus, the fan is able to draw fluid 24 through the passageway inlets 74 through the fluid passageway 20 and into the fan inlet 78. A suitable fan is a 20×20×8 mm SHICOH DC brushless fan sold by EVOX-Rifa Group located in Lincolnshire, Ill. This fan has low noise and consumes a minimal amount of energy. The design of the fluid passageway 20 and the fins 66 can be optimized to conform to the design of the fluid source 22.

Alternately, for example, the fluid source 22 could be a fan (not shown) which blows the fluid 24 through the fluid passageway 20. A blowing fan may increase the turbulence of the flow of the fluid 24 in the fluid passageway 20 and may increase thermal transfer. However, with a blowing fan, the fluid 24 will pass over a hot fan motor prior to entering the fluid passageway 20.

Importantly, the present disk drive utilizes convection cooling to improve the thermal transfer of the disk assembly 14 and actuator assembly 16 within the drive housing 12. This allows the components in the disk drive 10 to operate at cooler temperatures. The cooler operating temperature reduces the amount of thermal expansion, increases the accuracy of the disk drive, and increases the operational life of the electrical and mechanical components of the disk drive.

While the particular disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:

a drive housing defining a housing internal chamber;

a storage disk positioned within the housing internal chamber;

a fluid passageway extending through a portion of the housing internal chamber, near the storage disk, the fluid passageway being in fluid isolation from the storage disk; and a fluid source which provides fluid flow through the fluid passageway to cool a portion of the housing internal chamber.

2. The disk drive of claim 1 including a fin which extends into the fluid passageway to enhance thermal transfer from the housing internal chamber.

3. The disk drive of claim 1 further comprising a shroud positioned within the housing internal chamber between a portion of the storage disk and a housing side wall of the drive housing, the shroud providing fluid isolation between the fluid passageway and the storage disk.

4. The disk drive of claim 3 wherein the shroud includes at least one fin which cantilevering outwardly towards the housing side wall to enhance heat transfer between the shroud and the fluid.

5. The disk drive of claim 3 wherein the shroud cooperates with a first housing end wall of the drive homing to substantially encircle the storage disk.

6. The disk drive of claim 5 wherein the first end wall includes a passageway inlet which is in fluid communication with the fluid passageway.

7. The disk drive of claim 1 wherein the fluid passageway extends along a housing side wall of the drive housing.

8. The disk drive of claim 1 wherein the fluid source includes a fan having a fan inlet which is in fluid communication with the fluid passageway.

9. A computer including the disk drive of claim 1.

10. A disk drive comprising:

a drive housing including a base, a pair of spaced apart housing end walls and pair of spaced apart housing side walls which define a housing internal chamber;

a disk assembly positioned within the housing internal chamber;

an actuator assembly positioned within the housing internal chamber;

a shroud positioned with in the housing internal chamber, the shroud cooperating with the drive housing to define a fluid passageway which extends through the housing internal chamber, the fluid passageway being in fluid isolation from the disk assembly and the actuator assembly; and a fluid source which provides fluid flow through the fluid passageway to cool the disk assembly and the actuator assembly.

11. The disk drive of claim 10 wherein the shroud includes at least one fin which extends towards one of the housing side walls to enhance thermal transfer between the shroud and the fluid.

12. The disk drive of claim 10 wherein the shroud cooperates with one of the housing end walls of the dried housing to substantially encircle the storage disk.

13. The disk drive of claim 10 wherein the fluid passageway extends along each housing side wall of the drive housing.

14. The disk drive of claim 10 wherein the fluid source includes a fan having a fan inlet which is in fluid communication with the fluid passageway.

15. A method for cooling a drive housing of a disk drive, the disk drive including a storage disk positioned within a housing internal chamber, the method comprising the steps of:

provuding a fluid passageway which extending through a portion of the housing internal chamber, near the storage disk, the fluid passageway being in fluid isolation from the storage disk; and creating fluid flow through the fluid passageway to cool a portion of the housing internal chamber.

16. The method of claim 15 wherein the step of creating fluid flow includes the step of using a fan to create fluid flow through the fluid passageway.

17. The method of claim 15 wherein the step of providing a fluid passageway includes the step of providing a shroud which maintains fluid isolation between the storage disk and the fluid passageway.

18. The method of claim 16 including the step of providing fins which extend into the fluid passageway enhance thermal transfer.

\* \* \* \* \*